(12) United States Patent
Hodges et al.

(10) Patent No.: US 12,489,844 B2
(45) Date of Patent: Dec. 2, 2025

(54) SOURCE AGNOSTIC CALL RECORDING AND CHAT INGESTION

(71) Applicant: Capital One Services, LLC, McLean, VA (US)

(72) Inventors: Trent F. Hodges, Richmond, VA (US);
Alayna Francis, Roanoke, VA (US);
Balaraju Gujjari, Little Elm, TX (US);
Srilaxmi Sowmya Penmatsa, Glen Allen, VA (US); Harmanjit Singh, Dublin, OH (US); Parameswar Dasari, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 252 days.

(21) Appl. No.: 18/083,113

(22) Filed: Dec. 16, 2022

(65) Prior Publication Data

US 2024/0205330 A1    Jun. 20, 2024

(51) Int. Cl.
*H04M 1/64* (2006.01)
*H04M 3/42* (2006.01)
*H04M 3/51* (2006.01)
*G10L 15/26* (2006.01)

(52) U.S. Cl.
CPC ..... *H04M 3/42221* (2013.01); *H04M 3/5191* (2013.01); *G10L 15/26* (2013.01); *H04M 2201/405* (2013.01)

(58) Field of Classification Search
CPC ............. H04M 3/42221; H04M 3/493; H04M 3/5175; H04M 3/5191; H04M 2201/405; G10L 15/26; G10L 17/22; G06F 16/90335; G06F 16/683

USPC ...................................................... 379/88.01

See application file for complete search history.

(56) References Cited

U.S. PATENT DOCUMENTS

| 10,931,827 B1 | 2/2021 | Jayapalan et al. |
| 11,277,516 B2 | 3/2022 | Dwyer et al. |
| 2009/0307201 A1* | 12/2009 | Dunning ............... G06F 16/683 707/999.005 |

(Continued)

OTHER PUBLICATIONS

Bednarz, Ann. "Companies look to streamline call center operations: Streamlining the management of multiple locations". Aug. 23, 2006. pp. 1-3. Available from the Internet at https://www.networkworld.com/article/2306139/companies-look-to-streamline-call-center-operations.html.

*Primary Examiner* — Md S Elahee
(74) *Attorney, Agent, or Firm* — Sterne, Kessler, Goldstein & Fox P.L.L.C.

(57) ABSTRACT

Disclosed herein are system, method, and computer program product embodiments for ingesting batch or real-time incoming audio or text interactive communications. The system verifies that the interactive communication excludes security threats, comprises associated metadata, verifies that the interactive communication is linked to an existing or previous customer's interaction within an organization, enriches the associated metadata with additional data from the customer's interaction within an organization, transforms a media file type of the interactive communication to a common media file type, generates a transcript of the interactive communication, registers the enriched associated metadata with a stored copy of the transcript, and instantiates an interface to provide organizational access to the registered enriched associated metadata and stored copy of the transcript.

19 Claims, 7 Drawing Sheets

(56) References Cited

U.S. PATENT DOCUMENTS

| | | | | |
|---|---|---|---|---|
| 2013/0272511 | A1* | 10/2013 | Bouzid | H04M 3/493 |
| | | | | 379/88.01 |
| 2016/0350699 | A1 | 12/2016 | Vymenets et al. | |
| 2017/0235848 | A1* | 8/2017 | Van Dusen | G06F 16/90335 |
| | | | | 705/12 |
| 2023/0335139 | A1* | 10/2023 | Breton | G10L 17/22 |
| 2024/0029739 | A1* | 1/2024 | Nadig | G10L 15/26 |

* cited by examiner

SOURCE AGNOSTIC CALL RECORDING AND CHAT INGESTION

BACKGROUND

Text and speech may be analyzed by computers to discover words and sentences. However, missing in current computer-based text/speech analyzers is an ability to ingest voice and text from multiple sources without building unique paths from source to computer storage. Current technology has trouble determining relationships between voice and text data from multiple sources making merging of voice and text difficult.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
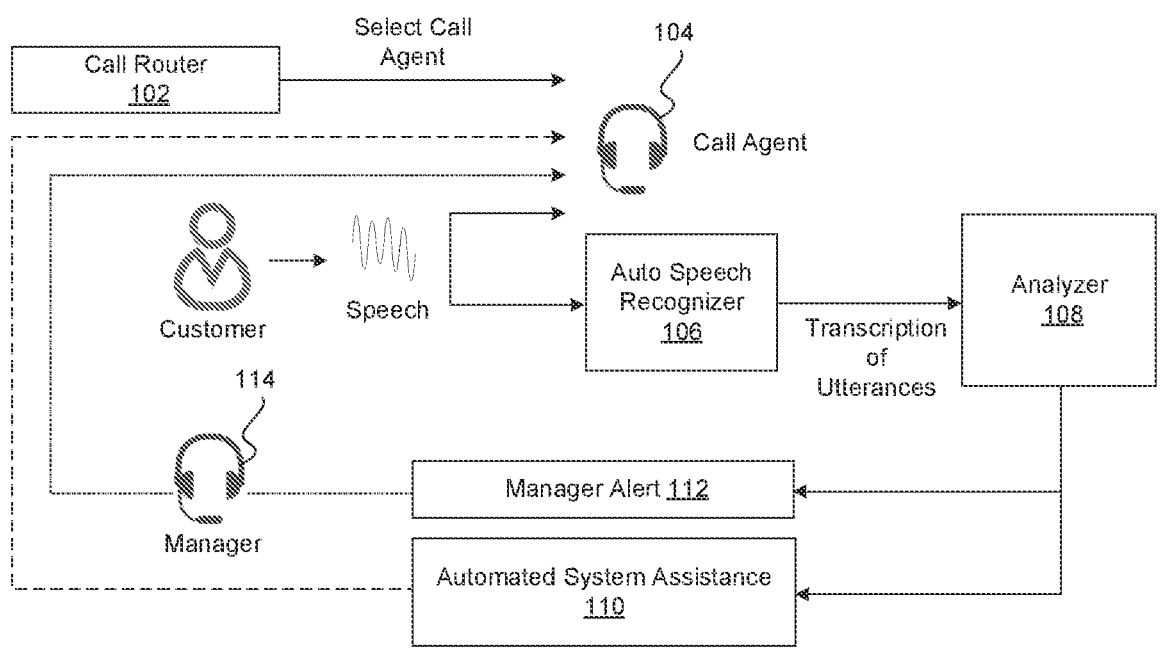
FIG. 1 is a flow diagram for a call center system processing an incoming call, according to some embodiments.

Provided herein are system, apparatus, device, method and/or computer program product embodiments, and/or combinations and sub-combinations thereof to implement capturing and processing of multi-source voice and text (e.g., chats). In systems where feedback is received from multiple sources, such as voice or text, the feedback processing system solutions described herein properly capture multi-source voice and text data without building separate communication paths, enriching this data with associated metadata and subsequent leveraging of this captured information to provide real-time responses to affect future interactive communications.

In some embodiments, the technology described herein implements a consolidated ingestion processing engine for capturing call recordings or chats into a call processing computer platform while being agnostic to the originating system on which a call or chat was taken, whether internally or externally. New sources are implemented based on configuration rather than a custom build each time. This technology improves the call processing computer platform by allowing quick onboarding of new sources, for example external vendors, and any other desired source, such that all calls or chats can be aggregated, reviewed, analyzed or searched in an interactive communications quality review platform.

Customer call centers lie at the heart of the interaction between businesses and their customers. Businesses receive calls and chats every month that involve customer-agent interactions that address customer issues and complaints ranging from a straightforward address-change request to more emotion-laden interactions involving, for example, a hardship-based fee reduction request. Resolving such issues is complex because it requires understanding customers, providing information (in terms of relevance, quantity, and scope), and quickly finding a solution. Call center agents are a precious resource: costly and limited in number. Therefore, it is of the utmost importance to include technical solutions improving quality check interactions, resolving customer issues, and providing a top-notch customer experience.

In some embodiments, the technology described herein implements an ingestion process that can import call recordings or chats into a quality platform from internal or external producers. This makes the quality platform agnostic to where calls or chats are taken and provides a single location to listen to all calls and read all chats for an organization.

In some embodiments, the technology described herein implements an ingestion process that may provide available paths for both real-time and batch ingestion and to support either new or historical voice or text.

In some embodiments, the technology described herein implements voice and text ingestion security processes to ensure access to only known producers of a call or chat service.

In some embodiments, the technology described herein implements throttling of traffic to prevent performance issues during busy customer contact periods or during large voice or text downloads.

In some embodiments, the technology described herein implements return codes for success or failure, with reasons for failure (e.g., missing metadata).

In some embodiments, the technology described herein implements data caching and regional resiliency patterns to handle potential system issues.

In some embodiments, the technology described herein implements streaming of raw data for each call recording so that it can be consumed downstream.

Therefore, the technology described herein improves the technology associated with handling calls and chat sessions by, at a minimum, properly capturing multi-source voice and chat texts. Properly captured voice and chat data, as described herein, is one element leading to higher correlated solutions. As such, the technology described herein improves a computer's quality control ability, specifically how a computer captures multi-sourced voice and text from chats for a quality control platform, thereby improving the storage capabilities and operation of the computer system itself.

Throughout the descriptions, the terms "call", "voice", "speech" and "audio" may be interchangeably used. In addition, the term "chatbot" may also refer to the text output from a chatbot session.

FIG. 1 illustrates an example call center system 100 processing an incoming interactive communication such as a customer call, as per some embodiments. Call center system 100 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 1, as will be understood by a person of ordinary skill in the art.

Call center system 100 shall be described with reference to FIG. 1. However, call center system 100 is not limited to this example embodiment. In addition, call center system 100 will be described at a high level to provide an overall understanding of one example call flow from incoming call to call agent assistance. While described for calls, chat sessions may be implemented using a similar system flow, without the auto speech recognition and transcription components. Greater detail will be provided in the figures that follow.

Call center calls are routed to a call agent 104 through a call router 102. Call router 102 may analyze pre-call information, such as a caller's profile, previous call subjects, previous call interactions, voice menu selections or inputs to automated voice prompts. Call agents may be segmented into groups by subject matter expertise, such as experience with specific subjects (e.g., themes or topics). Understanding which call agent to route the incoming call to may ultimately determine a successful outcome, reduce call time and enhance a customer's experience.

Once a call agent 104 is selected, an auto speech recognizer 106 may analyze the incoming caller's speech in real time by sequentially analyzing utterances and converting to a textual transcript. Utterances may include a spoken word, statement, or vocal sound. Transcripts may be analyzed by analyzer 108 for various reasons to provide assistance to the call agent, caller or both through automated system assistance 110 or through a manager alert 112 to a manager 114. As will be described in greater detail, a system may capture any or all of the original raw speech or chat text, the transcription, and assistance data and associated information. For example, for caller A, the technology described herein may capture a call session, including speech of the caller and the call agent, as well as the transcript, analysis and any remediation assistance. Ancillary information to the call or chat, for example, any known or derived information about the call, caller, call agent or call session, or chat, may be stored as metadata and be made part of the call or chat record. As a non-limiting example, derived data may be a result of an analysis of one or more components of an interactive communication, such as, but not limited to, detected complaints, caller emotions, prosodic clues (loudness, pace, etc.), phrasing, historical call record (e.g., called three times about the same issue), time spent on hold or time spent on the call, etc.

Figure 2:
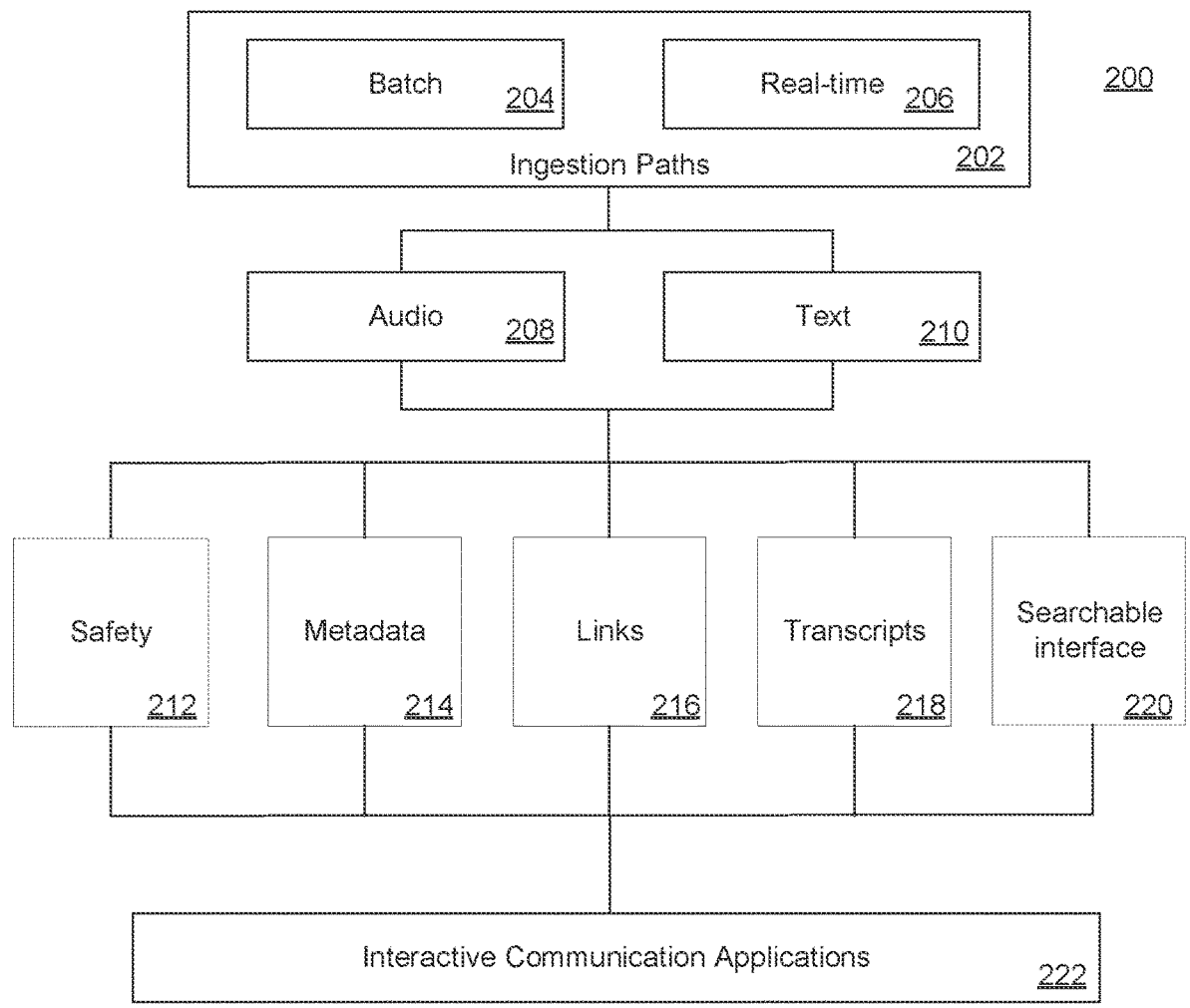
FIG. 2 illustrates an interactive communication ingestion system, as per some embodiments.

FIG. 2 illustrates an interactive communication ingestion system, as per some embodiments. Interactive communication ingestion system 200 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 2, as will be understood by a person of ordinary skill in the art. Interactive communication ingestion system 200 may be implemented, in some embodiments, as a gateway to ingest call recordings, transcripts and associated metadata. The interactive communication ingestion system 200 will be described herein at a high level and in greater detail in FIGS. 3-6 that follow.

As previously described, incoming calls to the customer call center 100 may be automatically transcribed into transcripts (i.e., text) using Auto Speech Recognizer 106 and the transcripts made available automatically. These transcriptions contain interactions that have happened so far for a current call and may also be a source of information. In a non-limiting example, these two resources of data will be used for the quality review approaches explained in greater detail hereafter.

Ingestion paths 202 for Audio 208 (e.g., speech) and Text 210 related to call or chat interactive communications may include a Batch path 204 and a Real-time path 206. A batch path 204 may be implemented to capture large sets of previously stored interactive communications or to aggregate individual communications into a batch (e.g., stage) with subsequent ingestion. In some embodiments, these large sets reflect historical interactions over some desired period of time, days, weeks, months or years. For example, call centers receive hundreds and thousands of calls or chats a day. These large sets of interactions may have been previously stored internally (e.g., cloud based storage) or may be transferred from external systems, such as a call processing vendor or other geographically located call centers.

In various embodiments, a batch ingestion may be triggered in multiple ways. In one non-limiting example, an interactive communication source may communicate with a gateway of the interactive communication ingestion system 200 to initiate a download. For example, an audio or text file and associated metadata file may be communicated to the gateway for ingestion. In some embodiments, the audio or text file and associated metadata files are communicated to prefixes in a staging bucket used to stage job dependencies, job driver output, and configuration files. In some embodiments, the audio or text file will trigger a pipelined batch download process. Alternatively, or in addition, the interactive communication sources can communicate a zip archive file to the gateway. The zip file will be unzipped and then placed into the staging bucket and follow the same process as described for the staging bucket. In some embodiments, unsuccessful downloads because of invalid metadata, invalid zip files, missing audio, text or missing metadata, may be communicated back to the interactive communication source and one or more downloads repeated (i.e., retry) to correct for any errors.

In some embodiments, the real-time path 206 may include streaming voice, text or a combination thereof and may be implemented by, for example, HyperText Transfer Protocol (HTTP) endpoints. An HTTP Application Programming Interface (API) will determine if an ingestion of an interactive communication record is successful (e.g., metadata is validated and mapped to the ingested record with no problems. Alternatively, the ingestion may be unsuccessful if it is determine that a bad request was received where the metadata is potentially invalid or a mapping scheme missing or incorrect. Other examples of an unsuccessful ingestion may be detection of a bad gateway, where an error occurs upstream of the ingestion, or a server error, where an internal processing error occurs during ingestion.

Either path may also include, with the raw voice/text or transcripts, ancillary data, such as, but not limited to, identification parameters (i.e., for security), assistance measures, links for files, metadata, etc.

In some embodiments, the technology described herein implements voice and text ingestion safety processes 212 to ensure access to the ingestion platform by only known producers of a service. For example, the identification parameters may be used to protect customer interaction data. In addition, the data may be scrubbed to remove personal identifiers, such as, but not limited to credit card data, social security numbers, contact information, etc. For example, the ingested interactive communications may be used for training purposes, but without a customer's personal information, which is not required for training.

In some embodiments, the technology disclosed herein is configured to prepare ingested interactive communications. In one non-limiting example, associated metadata 214 is extracted and verified (e.g., if a zip file is provided). In some embodiments metadata may be enhanced by adding missing metadata or additional metadata, such as previous or existing interactive communication agent identifiers, theme or subject matter, customer sentiments, complaints, emotions, timing, call patterns, etc.

In some embodiments, the metadata may include, but is not limited to, business identification and hierarchy, such as division, line of business (LOB), sub LOB, location (e.g., site), or personnel hierarchy (e.g., supervisor).

In some embodiments, metadata may include various timestamps of various events, such as, but not limited to, when an interactive communication record is ingested, when the interactive communication was initiated, when it ended, a last update to the record of the interactive communication, time spent by a call agent during the interactive communication, beginning time of interactive communication, completion time, time caller is in a queue waiting to speak with an agent (initial hold time, later hold time, longest hold time, number of times put on hold, etc.), how long before the customer terminated the communication while on hold, how many times the customer tried to make contact, or transfer information, etc.

In addition or alternatively, in some embodiments, the metadata may also reflect identifying information about the interactive communication, such as, but not limited to, a link to an original recording of raw speech data or a chat session, a software system of the source of the ingested records, a data format, a universally unique identifier for each customer, a call agent name, a caller name, call routing profiles, or links to associated data files (e.g., previous historical connections from same customer, etc.). In addition, in some embodiments, the metadata may reflect analytical information about the interactive communication, such as, but not limited to an identified problem (e.g., complaint, lost credit card, credit application assistance needed, etc.) and subsequent solution provided.

In some embodiments, the technology disclosed herein is configured to validate links 216 associated with the interactive communications. Input validations may include, but are not limited to, validation of metadata 214 and/or a .wav file (e.g., raw speech). For example, in some embodiments, metadata 214 is mapped or transformed to a target format. In one non-limiting example, the target format may be a .wav file.

As previously described, transcripts 218 of the interactive communication may be included in the ingestion process. The transcripts may include the caller and call agent as a single transcript or may use known identifying processes (e.g., speech recognition software) to separate each participant into separate transcripts. Interactive communication data needed to support Interactive Communication Applications 222, such as training (e.g., coaching), and finding insights into interactive communications using machine learning, artificial intelligence analysis, complaint detection, assistance solutions, or customer or call agent emotional analysis, etc. may be available by search through Searchable Interface 220. For example, to study an effectiveness of a specific assistance technique, a search of difficult calls (e.g., complaint detected) from the last 6 months may be combined with a search of assistance solutions also engaged during this period of time.

Figure 3:
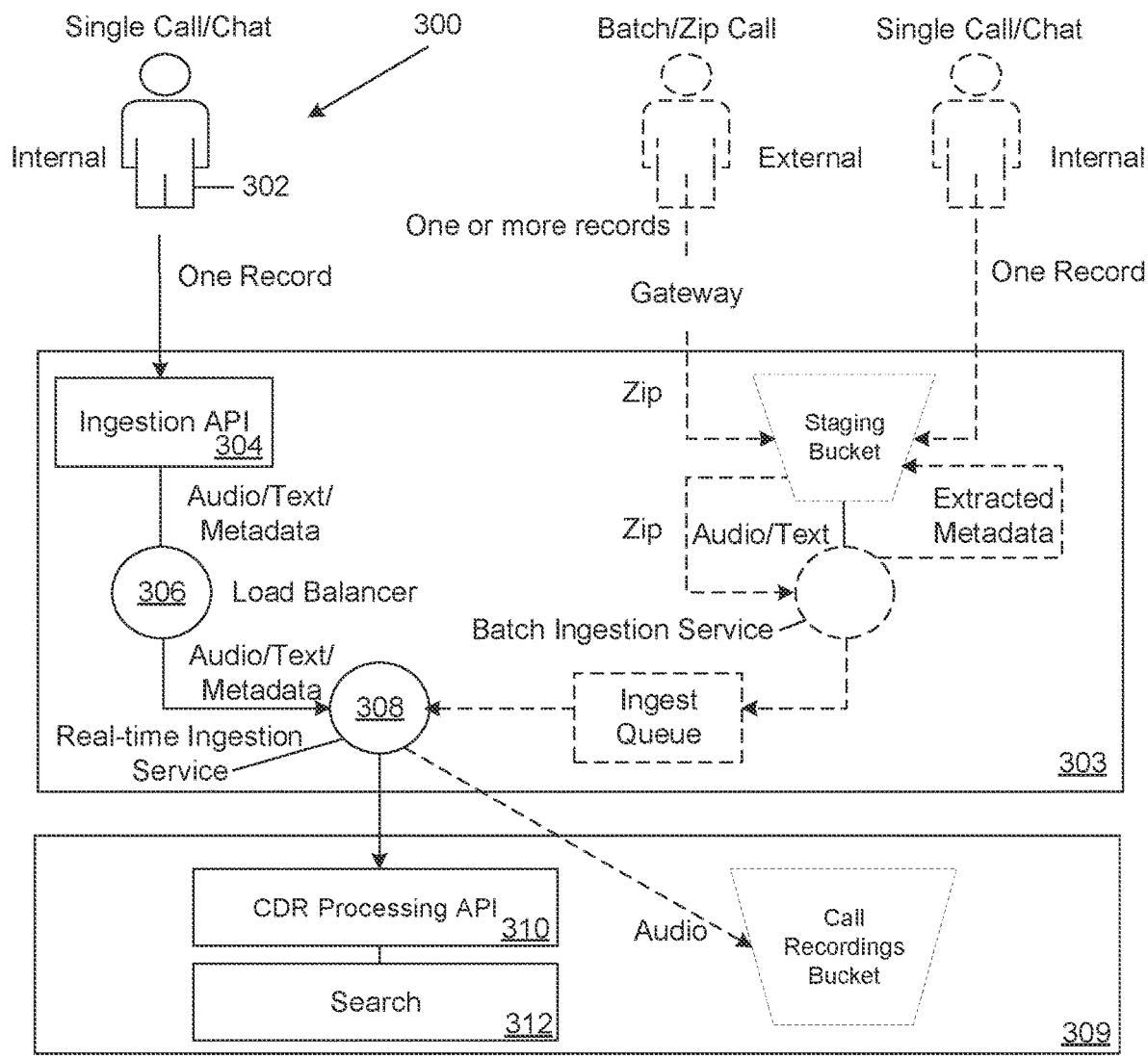
FIG. 3 illustrates a real-time ingestion platform, as per some embodiments.

FIG. 3 illustrates a real-time ingestion platform, as per some embodiments. Real-time ingestion path 300 may be executed by one or more computing units such as a processor, a special purpose computer, an integrated circuit, integrated circuit cores, a non-transitory computer readable medium or a combination thereof. The batch related processes are illustrated as optional elements and are described in detail in association with FIG. 4.

The non-transitory computer readable medium may be implemented with any number of memory units, such as a volatile memory, a nonvolatile memory, an internal memory, an external memory, or a combination thereof. The ingestion platform 303 and backend 309 may be integrated as a part of the call center system 100 or be operative therewith. While the real-time and batch paths are described in FIG. 3 and FIG. 4 as separate paths for simplicity reasons, in an exemplary embodiment, they are integrated into a single ingestion platform 303. Backend 309 may, in some embodiments, be integrated with the ingestion platform 303 or alternatively be implemented as a separate system.

In some embodiments, an internal system single call or chat interactive communication 302 may be received by real-time ingestion path 300 (previously real-time path 206) and may include streaming voice, text or a combination thereof and may be implemented by, for example, HyperText Transfer Protocol (HTTP) endpoints. An HTTP Application Programming Interface (API) 304 may receive one record (e.g., containing both voice and metadata) in real-time and subsequently determine if an ingestion of an interactive communication record is successful. For example, metadata is validated and mapped to the ingested record with no problems. Unsuccessful ingestions may be identified as a bad request, where the metadata is potentially invalid or a mapping scheme missing or incorrect, a bad gateway, where an error occurs upstream of the ingestion, or a server error, where an internal processing error occurs during ingestion. Alternatively, or in addition, a call producer may maintain ownership of the call recording storage, to which the quality system has access, and include a link or location of the original call in the metadata which is used when opening the call.

This path may also include, along with the raw voice/text, transcripts, ancillary data, identification parameters (e.g., for security), assistance measures, links for files, metadata, etc.

In some embodiments, Load Balancer 306 may balance the load on the ingestion platform 303 to ingest records. For example, during very busy times, a large volume of calls and chats may necessitate a throttling (slowing) of the real-time ingestion of these call and chats, with normal speed ingestion resuming during less busy times.

In some embodiments, Real-time Ingestion Service (e.g., microservice) 308 is configured to ingest the single records in real-time. Alternatively, or in addition, real-time ingestion service 308 may prepare the ingested interactive communications. In one non-limiting example, associated metadata is extracted and verified. In some embodiments, metadata may be enhanced by adding missing metadata or additional metadata, such as previous or existing interactive communication agent identifiers, theme or subject matter, customer sentiments, complaints, emotions, timing, call patterns, etc.

In some embodiments, the metadata may include, but is not limited to, business identification and hierarchy, such as division, line of business (LOB), sub LOB, location (e.g., site), or personnel hierarchy (e.g., supervisor).

In some embodiments, metadata may include various timestamps of various events, such as, but not limited to, when an interactive communication record is ingested, when the interactive communication was initiated, when it ended, a last update to the record of the interactive communication, time spent by a call agent during the interactive communication, beginning time of interactive communication, completion time, time caller is in a queue waiting to speak with an agent (initial hold time, later hold time, longest hold time, number of times put on hold, etc.), how long before the caller terminated the communication while on hold, how many times the customer tried to make contact, or transfer information, etc.

Alternatively or in addition, the metadata may reflect identifying information about the interactive communication, such as, but not limited to, a link to an original recording of raw speech data or a chat session, a software system of the source of the ingested records, a data format, a universally unique identifier for each customer, a call agent name, a caller name, call routing profiles, or links to associated data files (e.g., previous historical connections from same customer, etc.). In addition, in some embodiments, the metadata may also reflect analytical information about the interactive communication, such as, but not limited to an identified problem (e.g., complaint, lost credit card, credit application assistance needed, etc.) and a subsequent solution provided.

Ingested calls or chats and associated metadata are stored in computer storage through call Data Records. A Call Data Record (CDR) is the object that contains at least the metadata. Metadata Processing API 310 may perform validation checks on the metadata (e.g., required fields exist, valid values, correct ranges, etc.), enrich the data (e.g., translate an agent ID into a full agent name by calling a Human Resources (HR) API) and load the metadata into the database.

Backend systems 309 may, in some embodiments, implement a Search Interface 312 as a mechanism for interactive communication applications, primarily focused on quality, to analyze and process the ingested data to improve quality through understanding underlying relationships of similar data (e.g., all calls on a specific subject). This understanding provides rich opportunities to improve call agent training, automated assistance systems, chatbot responses, mature subject matter expertise, budgeting of resources (call agents and system resources), etc.

Figure 4:
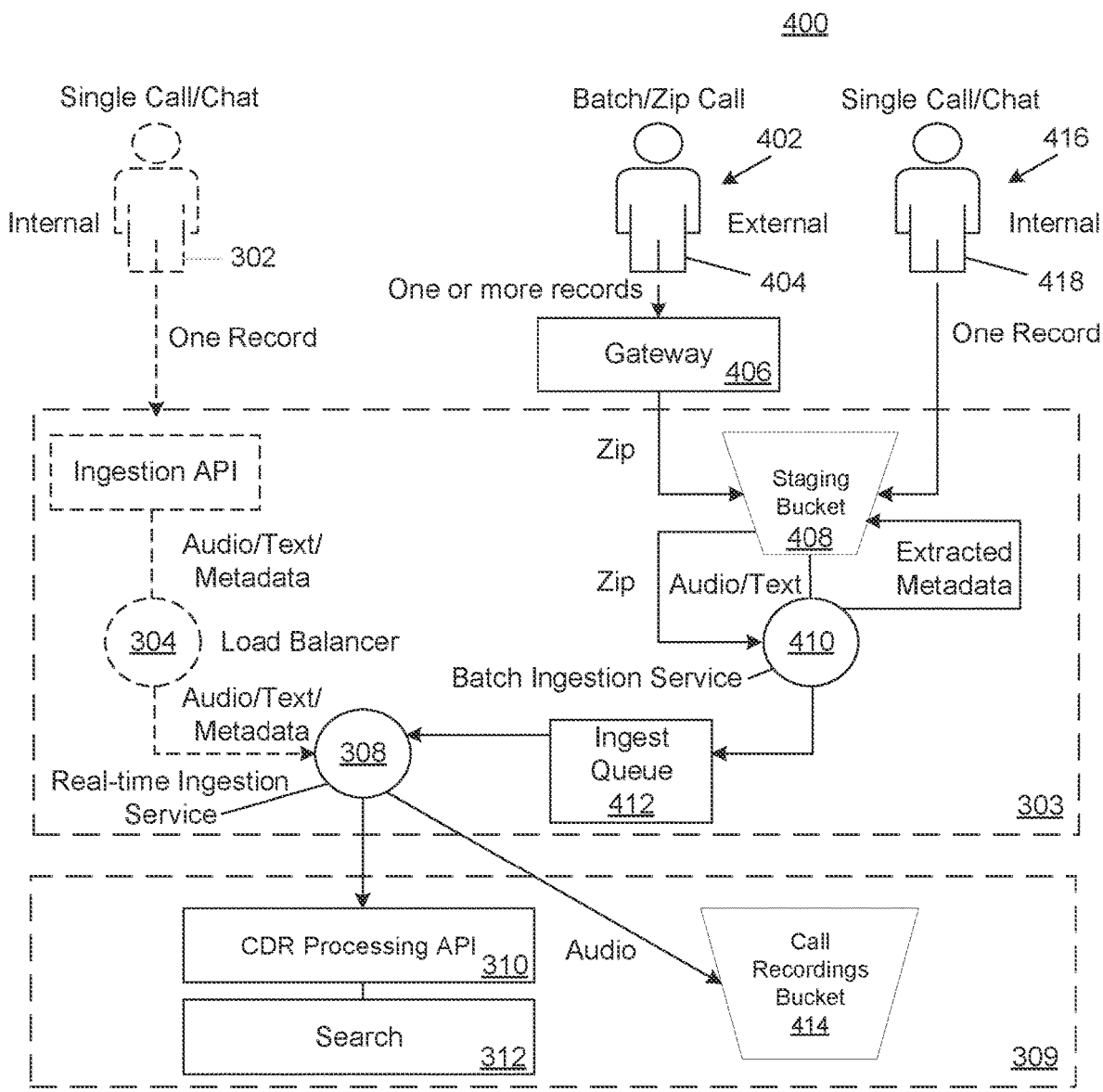
FIG. 4 illustrates a batch ingestion platform, as per some embodiments.

FIG. 4 illustrates a batch ingestion platform, as per some embodiments. Batch ingestion path 400 may be executed by one or more computing units such as a processor, a special purpose computer, an integrated circuit, integrated circuit cores, a non-transitory computer readable medium or a combination thereof. The non-transitory computer readable medium may be implemented with any number of memory units, such as a volatile memory, a nonvolatile memory, an internal memory, an external memory, or a combination thereof. The ingestion platform 303 may be integrated as a part of the call center system 100 or be operative therewith.

A batch path may be implemented in a first path 402 for external sources to capture large sets of previously stored interactive communications, such as externally sourced audio or text file(s) 404, or in a second path 416 to aggregate individual internal communications 418 into a batch (e.g., stage) with subsequent ingestion. In some embodiments, these large sets reflect historical interactions over some desired period of time, days, weeks, months or years. For example, call centers receive hundreds and thousands of calls or chats a day. These large sets of interactions may have been previously stored internally (e.g., cloud based storage), obtained through an acquisition, or may be transferred from external systems, such as a call processing vendor or other geographically located call centers.

In various embodiments, a batch ingestion may be triggered in multiple ways. In one non-limiting example, an interactive communication source may communicate with a gateway 406 of the interactive communication ingestion system 400 to initiate a download. For example, externally sourced audio or text file(s) 404 and associated metadata file(s) may be communicated to gateway 406 for ingestion. In some embodiments, the audio or text files and associated metadata are communicated to prefixes in a staging bucket 408 used to stage job dependencies, job driver output, configuration files, monitor the progress of the ingestion process based on the driver output (e.g., to derive vendor based metrics).

In some embodiments, the audio or text file will trigger a pipelined batch download process. Alternatively or in addition, the interactive communication sources can communicate a zip archive file to the gateway. The zip file will be unzipped and then placed into the staging bucket 408 and follow the same process as described for the staging bucket.

Batch Ingestion Service 410 (e.g., microservice) will extract the audio, text, metadata file and record location (e.g., in the large set) from the zip file for ingestion. In some embodiments, batch ingestion service 410 may prepare the ingested interactive communications. In one non-limiting example, associated metadata is extracted and verified. In some embodiments, metadata may be enhanced by adding missing metadata or additional metadata, such as previous or existing interactive communication agent identifiers, theme or subject matter, customer sentiments, complaints, emotions, timing, call patterns, etc. Alternatively or in addition, as previously described, in some embodiments, real-time ingestion service 308 may prepare the ingested interactive communications received from batch ingestion service 410.

The large batch data sets are accumulated in ingest queue 412 as they are ingested by the real-time ingestion service into call data records through call Metadata Processing API 310 and made available to search interface 312 as previously described.

Figure 5:
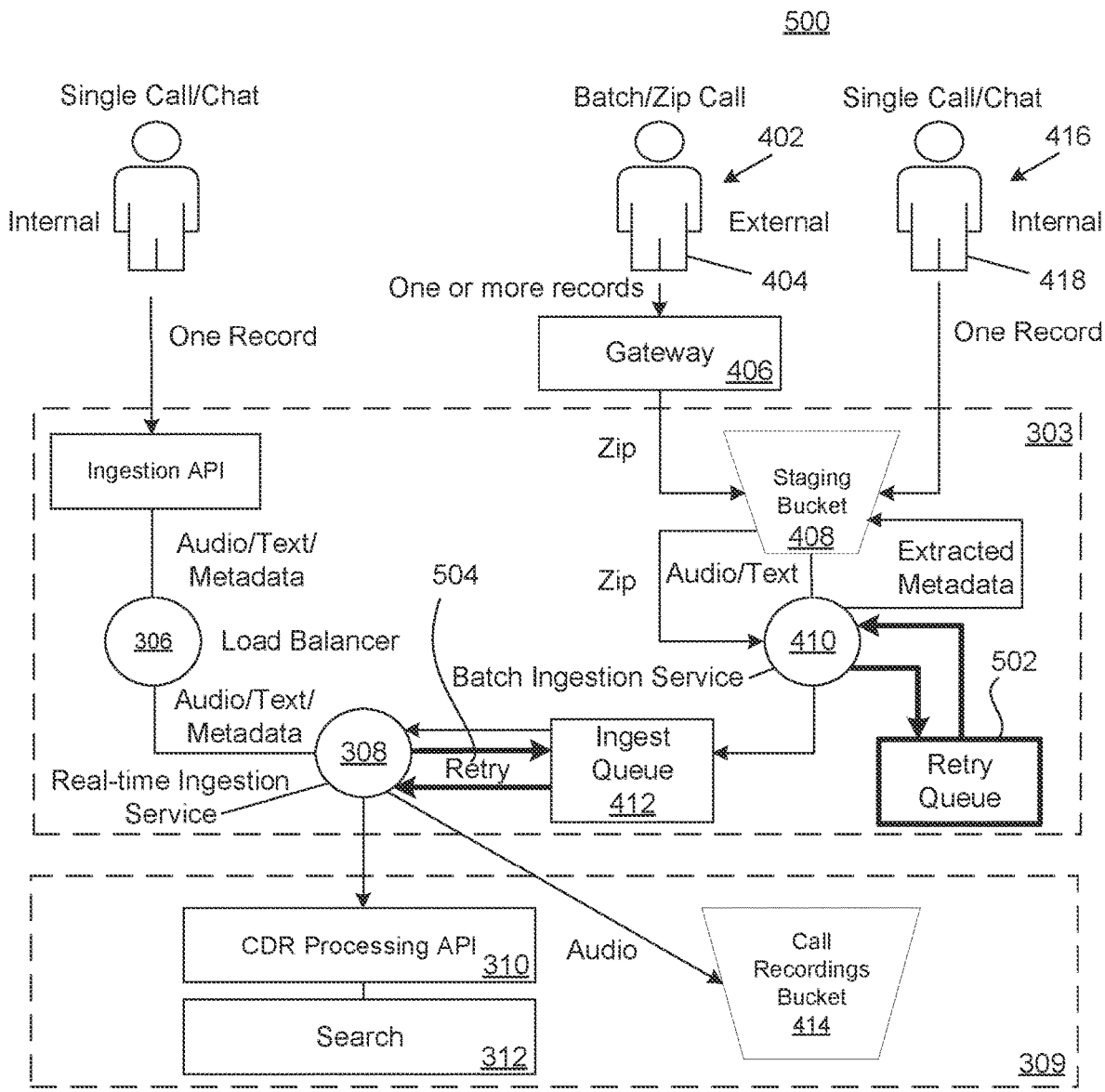
FIG. 5 illustrates an ingestion platform with retry, as per some embodiments.

FIG. 5 illustrates an ingestion platform 500 with retry, as per some embodiments. Some downloads may be unsuccessful because of invalid metadata, invalid zip files, missing audio, text, or missing metadata, etc. A notification of an unsuccessful download may be communicated back to the interactive communication source and one or more downloads repeated (i.e., retry) to correct for any errors. In one embodiment, Retry Queue 502 feeds the request for a record or records back to the interactive communication source 402 or 416 through the batch ingestion service 410. The retry queue 502 is used to feedback records back to batch ingestion service 410 for processing. For instance, if a call recording arrived, but the metadata associated did not arrive, the record is placed in the retry queue and polled after some period of time (e.g., 5 minutes). A retry max may be set, for example, for 3 times (e.g., a total 15 minutes), the system would expect the metadata to have arrived. If the metadata has not arrived at the end of this period, the system would treat that call recording unit as incomplete data.

For unsuccessful real-time downloads, a retry request 504 for single records within ingest queue 412 is made to single call/chat sources through the real-time ingestion service 308. For example, in the real-time queue, call metadata is processed one at a time as they come in. The batch process takes in many calls at once, but ultimately processes them one at a time leveraging the queuing mechanism through the same process that real-time uses.

Figure 6:
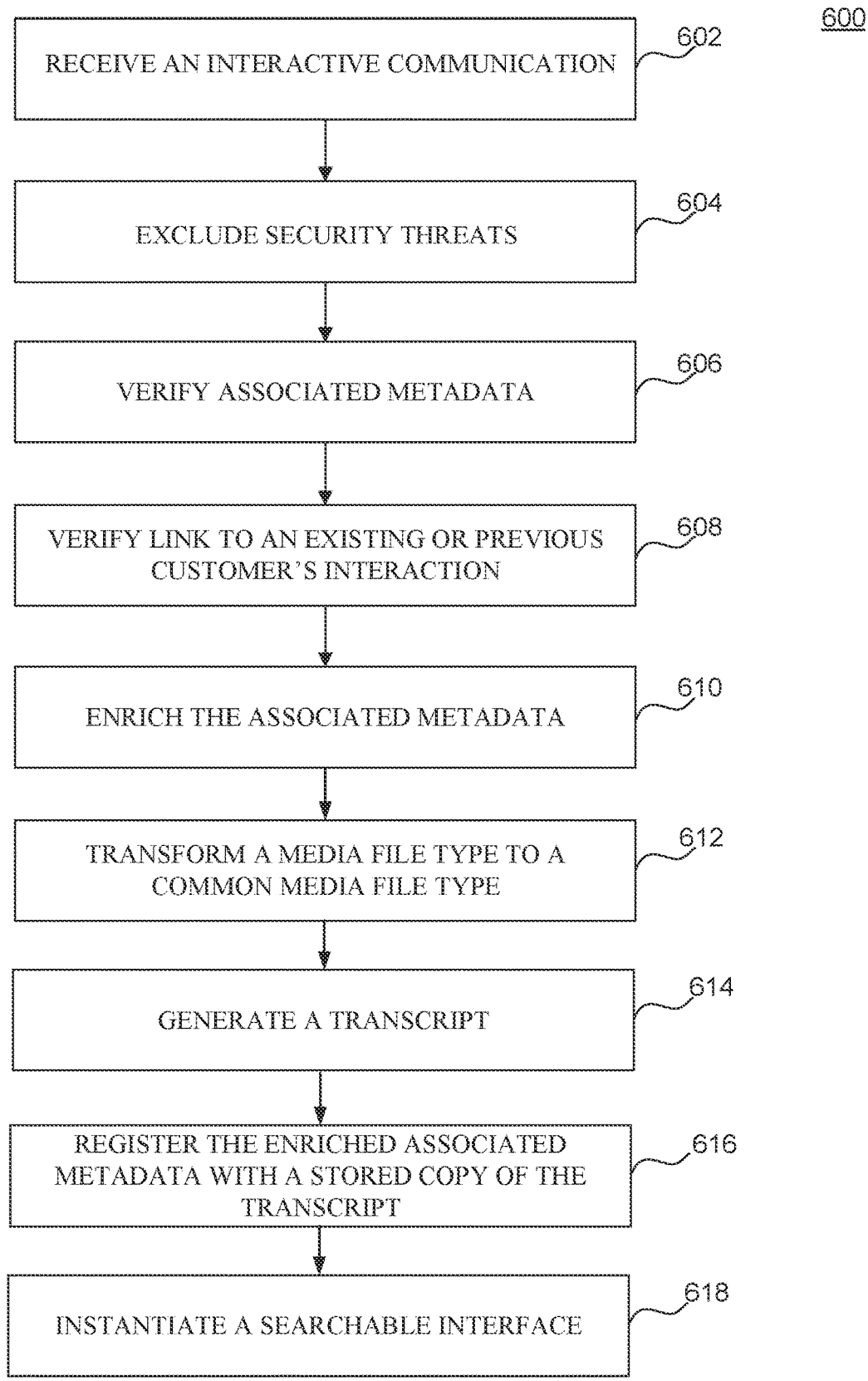
FIG. 6 is a flow diagram for real-time and batch ingestion, according to some embodiments.

FIG. 6 is a flow diagram for real-time and batch ingestion, according to some embodiments The ingestion functionality shown in diagram 600 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the call center system 100, ingestion platform 303 or installed as a removable portion these systems.

In 602, interactive communications, such as calls or chats, are received internally or externally by an ingestion platform in real-time or as batch files. The technology described herein implements an ingestion process for previous interactive communications in batch form or new single records as real-time interactive communications. For example, real-time calls or chats are received as shown in path 300 and batch files are processed as shown in path 400.

In 604, the ingestion platform verifies that the interactive communication excludes security threats. For example, based on an interactive communication source identifier (e.g., call center vendor identifier), a verification of the external party or file safety is performed (i.e., virus check). For example, safety component 212 implements voice and text ingestion security processes to ensure access to only known producers of a service. For example, the identification parameters may be used to protect customer interaction data. In addition, the data may be scrubbed to remove personal identifiers, such as, but not limited to credit card data, social security numbers, contact information, etc.

In 606, the ingestion platform verifies that the interactive communication comprises associated metadata. In a non-limiting example, the ingestion platform verifies correct metadata provided along with an external call recording. For example, Real-time ingestion service 308 or batch ingestion service 410 receive and process metadata as shown in paths 300 and 400.

In 608, the ingestion platform verifies that an interactive communication is linked to an existing or previous customer's interaction within an organization. In a non-limiting example, a call is linked to other steps of that customer's current or previous interactions with the organization (e.g., chat to IVR to Agent 1 to Agent 2). For example, the metadata may reflect identifying information about the interactive communication, such as, but not limited to, a link to an original recording of raw speech data or a chat session, a software system of the source of the ingested records, a data format, a universally unique identifier for each customer, a call agent name, a caller name, call routing profiles, or links to associated data files (e.g., previous historical connections from same customer, etc.). In a non-limiting example, a series of chats, calls, emails, etc., may be put into a standard format (e.g., text with metadata tags), so that an entire flow or a selected portion of a user's communication interactions can be easily viewed. For example, the flow may be organized by customer, by time, by subject matter, by related commercial product, by theme, by common word phrasing, or combinations thereof. In another non-limiting example, the links may be in the form of a traversal graph or the like that visually depicts the sequence of communication interactions. For example, a graphical user interface (GUI) provides a visualization of the entire flow, one or more portions of the flow, or a specific portion of the flow for quick review by the call agent or call manager. In one example aspect, the GUI may further include additional links associated with each portion.

In 610, the ingestion platform enriches the associated metadata with additional data from the customer's interaction within an organization. For example, services to enrich metadata may include a human resources (HR) system to populate call agent first/last name based on their ID. In addition, enrichment of metadata may include adding analytical information about the interactive communication, such as, but not limited to an identified problem (e.g., complaint, lost credit card, credit application assistance needed, etc.) and a subsequent solution provided.

In 612, the ingestion platform transforms, when disparate file types are ingested, a media file type of the interactive communication to a common media file type. For example, a transformation of a media file type of a call for the backend end system 309 may be needed to support what the system can play.

In 614, the ingestion platform generates, based on the interactive communication comprising audio and a trained machine learning model, a transcript of the interactive communication. In a non-limiting example, the ingestion platform creates a transcript for the call agent/customer (i.e., speech to text) and redacts any sensitive data or creates a call recording for a text based interaction like a chat (i.e., text to speech). In another non-limiting example, the ingestion platform creates a second copy of the call recording that obfuscates any company or customer sensitive data (e.g., "safe" audio). In a non-limiting example, the ingestion platform pre-processes the speech wave form for original and safe audio of call/chat (e.g., the visual representation of the call separated into channels, when calls are recorded in stereo, to differentiate the customer and agent parts of the conversation).

In 616, the ingestion platform registers the enriched associated metadata with a stored copy of the transcript. In another non-limiting example, the ingestion platform stores the call recordings (original and safe versions) and transcripts in a storage location known by and accessible to a call quality system. A quality system analyzes the calls to detect errors and for training purposes. The ingestion platform registers the enriched associated metadata in the quality system database so that it can be used to find calls. The transcript data is also registered in the quality system database so that text can be used to find calls.

In 618, the ingestion platform instantiates a searchable interface to provide organizational access to the registered enriched associated metadata and stored copy of the transcript. For example, backend systems 309 may, in some embodiments, implement a Search Interface 312 as a mechanism for interactive communication applications, primarily focused on quality, to analyze and process the ingested data to improve quality through understanding underlying relationships of similar data (e.g., all calls on a specific subject).

Figure 7:
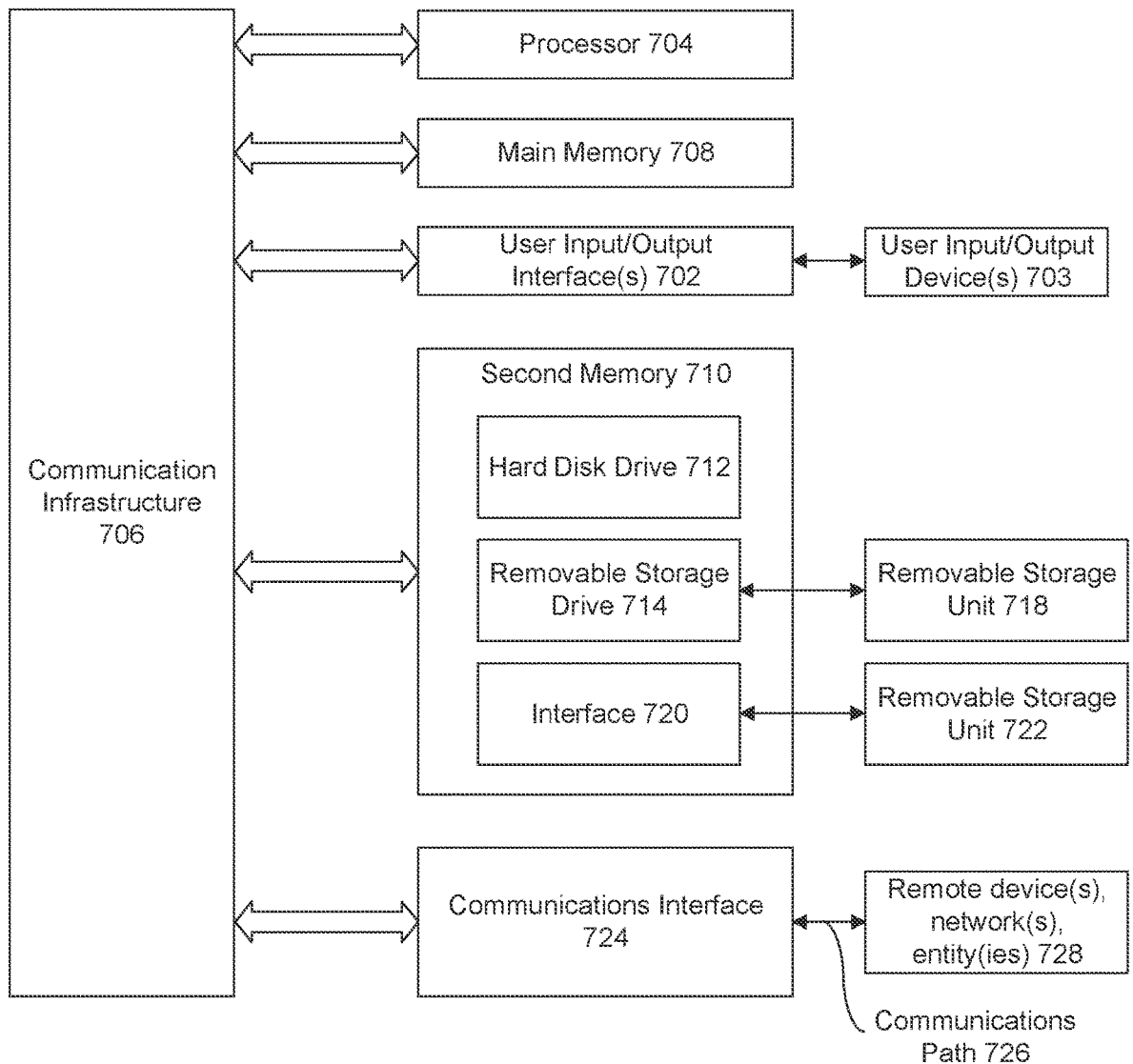
FIG. 7 is an example computer system useful for implementing various embodiments.

Various embodiments can be implemented, for example, using one or more computer systems, such as computer system 700 shown in FIG. 7. For example, computer system 700 can identify topics and keywords/phrases in call center calls. Computer system 700 can be any computer capable of performing the functions described herein. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired, and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system comprising:
   a memory; and
   at least one processor coupled to the memory and configured to:
   receive, by a staging bucket and from a plurality of ingestion paths, a plurality of types of interactive communications, wherein the plurality of types of interactive communications are receivable in both a real-time mode and a batch mode, and wherein the staging bucket retains corresponding audio, text, or associated metadata from the plurality of types of interactive communications;
   verify that each of the interactive communications comprises the associated metadata;
   verify that each of the interactive communications is linked to an existing or previous customer's interaction within an organization;
   enrich the associated metadata with additional data from the customer's interaction within an organization to generate enriched metadata;
   generate, based on the interactive communications comprising audio, a transcript of the interactive communications;
   register the enriched metadata with a stored copy of the transcript; and
   instantiate an interface to provide organizational access to the registered enriched associated metadata and stored copy of the transcript.

2. The system of claim 1, wherein the at least one processor is further configured to obfuscate sensitive data within the interactive communications to generate the stored copy.

3. The system of claim 1, wherein the at least one processor is further configured to pre-process a waveform of one or more of the interactive communications or the stored copy into channels.

4. The system of claim 3, wherein the at least one processor is further configured to separate the channels for at least a customer and one or more call agents.

5. The system of claim 1, wherein the at least one processor is further configured to transform a media file type of the interactive communications to a common media file type.

6. The system of claim 1, wherein the at least one processor is further configured for a search interface to search for the interactive communications or the stored copy based at least partially on the enriched metadata.

7. The system of claim 1, wherein the at least one processor is further configured for a search interface to search for the interactive communications or the stored copy based at least partially on the transcript.

8. The system of claim 1, wherein the at least one processor is further configured to stream raw data associated with the interactive communications.

9. A computer implemented method for processing an interactive communication, the method comprising:
   receiving, by a staging bucket and from a plurality of ingestion paths, a plurality of types of interactive communications, wherein the plurality of types of interactive communications are receivable in both a real-time mode and a batch mode, and wherein the staging bucket retains corresponding audio, text, or associated metadata from the plurality of types of interactive communications;
   verifying that each of the interactive communications comprises the associated metadata;
   verifying that each of the interactive communications is linked to an existing or previous customer's interaction within an organization;
   enriching the associated metadata with additional data from the customer's interaction within an organization;
   generating, based on the interactive communications comprising audio and a trained machine learning model, a transcript of the interactive communications;
   registering the enriched associated metadata with a stored copy of the transcript; and
   instantiating an interface to provide organizational access to the registered enriched associated metadata and stored copy of the transcript.

10. The method of claim 9, further comprising obfuscating sensitive data within the interactive communications to generate the stored copy.

11. The method of claim 9, further comprising pre-processing a waveform of one or more of the interactive communications or the stored copy into channels.

12. The method of claim 11, further comprising separating the channels for at least a customer and one or more call agents.

13. The method of claim 9, further comprising transforming a media file type of the interactive communications to a common media file type.

14. The method of claim 9, further comprising, based on a search interface, searching for the interactive communications or the stored copy based at least partially on the enriched metadata.

15. The method of claim 9, further comprising, based on a search interface, searching for the interactive communications or the stored copy based at least partially on the transcript.

16. The method of claim 9, further comprising streaming raw data associated with the interactive communications.

17. The method of claim 9, further comprising verifying that the interactive communications exclude security threats.

18. A non-transitory computer-readable device having instructions stored thereon that, when executed by at least one computing device, cause the at least one computing device to perform operations comprising:
   receiving, by a staging bucket and from a plurality of ingestion paths, a plurality of types of interactive communications, wherein the plurality of types of interactive communications are receivable in both a real-time mode and a batch mode, and wherein the staging bucket retains corresponding audio, text, or associated metadata from the plurality of types of interactive communications;
   verifying that the interactive communications comprise the associated metadata;
   verifying that the interactive communications are linked to an existing or previous customer's interaction within an organization;
   enriching the associated metadata with additional data from the customer's interaction within an organization;
   transforming a media file type of the interactive communications to a common media file type;
   generating, based on the interactive communications comprising audio and a trained machine learning model, a transcript of the interactive communications;
   registering the enriched associated metadata with a stored copy of the transcript; and instantiating an interface to provide organizational access to the registered enriched associated metadata and stored copy of the transcript.

19. The non-transitory computer-readable device of claim 18, further performing operations comprising:

verifying that the interactive communications exclude security threats.

* * * * *